(12) United States Patent
Kim et al.

(10) Patent No.: US 10,291,049 B2
(45) Date of Patent: May 14, 2019

(54) DOORBELL APPARATUS (71) Applicant: LG Innotek Co., Ltd., Seoul (KR)

(72) Inventors: Jae Myoung Kim, Seoul (KR); Jung Young Bae, Seoul (KR); Ki Kyung Jeon, Seoul (KR); Min Yong Choi, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 168 days.

(21) Appl. No.: 15/656,784

(22) Filed: Jul. 21, 2017

(65) Prior Publication Data
US 2018/0026452 A1 Jan. 25, 2018

(30) Foreign Application Priority Data

Jul. 22, 2016 (KR) .................. 10-2016-0093703
Aug. 11, 2016 (KR) .................. 10-2016-0102368

(51) Int. Cl.
*H02J 7/00* (2006.01)
*G08B 3/10* (2006.01)

(52) U.S. Cl.
CPC .............. *H02J 7/007* (2013.01); *G08B 3/10* (2013.01); *H02J 7/0068* (2013.01)

(58) Field of Classification Search
CPC ........ H02J 7/007; H02J 7/0068; H02J 7/0029; H02J 2007/0039; H02J 7/022; G08B 3/10
See application file for complete search history.

(56) References Cited

U.S. PATENT DOCUMENTS

2019/0013682 A1* 1/2019 Jeon .................... G10K 1/062

* cited by examiner

*Primary Examiner* — Robert L Deberadinis
(74) *Attorney, Agent, or Firm* — Saliwanchik, Lloyd & Eisenschenk (57) ABSTRACT

A doorbell apparatus according to one embodiment of the present disclosure includes an input port configured to receive power; an interface including a plurality of interface components and a first controller that is set to control the plurality of interface components; a battery configured to supply the power to the interface; a switching circuit connected to a switch and configured to change a path of a current that is supplied from the input port according to an ON or OFF state of the switch; and a second controller configured to control charging of the battery and a current supply to the interface using the current that is output from the switching circuit, wherein the second controller limits a current supplied to the interface according to an operation mode of the interface, and the operation mode includes a first operation mode and a second operation mode in which power required inside the interface is less than that of the first operation mode.

17 Claims, 10 Drawing Sheets

DOORBELL APPARATUS

CROSS-REFERENCE TO RELATED APPLICATIONS

This application claims priority to and the benefit of Korean Patent Application Nos. 10-2016-0093703, filed on Jul. 22, 2016; and 10-2016-0102368, filed on Aug. 11, 2016, the disclosures of each of which is incorporated herein by reference in its entirety.

BACKGROUND

1. Field of the Invention

The present disclosure relates to a doorbell apparatus.

2. Discussion of Related Art

A conventional doorbell system applied at home includes a transformer, a doorbell, and a doorbell switch. The transformer converts a level of an alternating current (AC) voltage into a level thereof suitable for operating the doorbell. The doorbell is a device for outputting a sound using electromagnetism or electricity, and may be interchangeably used with a bell, a buzzer, a chime, and the like. Further, the doorbell switch is a switch that is usually in an open state, and, when the doorbell switch becomes a closed state, the conventional doorbell system is activated. For example, when human presses the doorbell switch, the doorbell switch is closed to form a closed circuit with respect to the doorbell. Consequently, the doorbell may output a sound.

Meanwhile, as the need for user convenience increases, technology for connecting various interfaces to a doorbell system is developed. To this end, there is an attempt for branching power from a conventional door bell system to supply the power to interfaces. However, a closed circuit is formed with respect to a doorbell when a doorbell switch is closed so that there is a problem in that the power is not supplied to the interfaces. Consequently, a battery may be used to supply power to the interfaces. Meanwhile, to prevent an incorrect operation of a doorbell or noise generation, a current limitation is required inside a doorbell system. However, when a plurality of modules inside an interface simultaneously operate, there is a problem in that a current limitation is difficult.

SUMMARY OF THE INVENTION

Therefore, an objective of the present disclosure is to provide a doorbell apparatus including an interface.

A doorbell apparatus according to one embodiment of the present disclosure includes an input port configured to receive power; an interface including a plurality of interface components and a first controller that is set to control the plurality of interface components; a battery configured to supply the power to the interface; a switching circuit connected to a switch and configured to change a path of a current that is supplied from the input port according to an ON or OFF state of the switch; and a second controller configured to control charging of the battery and a current supply to the interface using the current that is output from the switching circuit, wherein the second controller limits a current supplied to the interface according to an operation mode of the interface, and the operation mode includes a first operation mode and a second operation mode in which power required inside the interface is less than that of the first operation mode.

The second controller may operate in a first current limiting mode or a second current limiting mode, and a maximum current supplied to the interface according to the first current limiting mode may be less than that supplied to the interface according to the second current limiting mode.

When the interface is in the first operation mode, the second controller may operate in the first current limiting mode, when the interface is in the second operation mode, the second controller may operate in the second current limiting mode, and the number of interface components, which are enabled in the first operation mode, may be greater than that of interface components which are enabled in the second operation mode.

While the interface operates in the first operation mode and the second controller operates in the first current limiting mode, power charged in the battery may be additionally supplied to the interface.

While the interface operates in the second operation mode and the second controller operates in the second current limiting mode, the battery may be charged.

When the switch converts from an ON state to an OFF state, the interface may operate in the first operation mode.

The first current limiting mode may be a universal serial bus (USB) 2.0 mode, and the second current limiting mode may be a USB 3.0 mode.

In the first current limiting mode, a maximum current that is able to be supplied from the second controller to the interface may be 450 milliampere (mA), and, in the second current limiting mode, a maximum current that is able to be supplied from the second controller to the interface may be 850 mA.

The doorbell apparatus may further include a voltage detector configured to detect a voltage between the input port and the interface, and at least some among the plurality of interface components may be enabled or disabled according to a level of the voltage that is detected by the voltage detector.

When a voltage of the input port is less than or equal to a predetermined voltage, the voltage detector may output a first digital value, when the voltage of the input port exceeds the predetermined voltage, the voltage detector may output a second digital value, and, when the first digital value is input, the first controller may disable at least one among the plurality of interface components.

The interface may include at least one of an encoder and a digital tilter, and the first controller may be set to enable or disable at least one of the encoder and the digital tilter according to the level of the voltage that is detected by the voltage detector.

A method for limiting a current of a doorbell apparatus according to one embodiment of the present disclosure, the method includes receiving power through an input port; changing a path of a current that is supplied through the input port according to an ON or OFF state of a switch; and controlling charging of a battery and a current supply to an interface using the current of which path is changed, wherein the controlling of the charging and the current supply includes limiting the current supplied to the interface according to an operation mode of the interface, and the operation mode includes a first operation mode and a second operation mode in which power required inside the interface is less than that of the first operation mode.

The limiting of the current may include setting a first current limiting mode when the interface is in the first operation mode; and, setting a second current limiting mode when the interface is in the second operation mode, wherein a maximum current supplied to the interface according to the first current limiting mode may be less than that supplied to the interface according to the second current limiting mode.

The interface may include a plurality of interface components, and the number of interface components, which are enabled in the first operation mode, may be greater than that of interface components which are enabled in the second operation mode.

The controlling of the charging and the current supply may further include controlling to additionally supply power charged in the battery to the interface when the first current limiting mode is set.

The controlling of the charging and the current supply may further include controlling the battery to be charged when the second current limiting mode is set.

The method may further include detecting a voltage between the input port and the interface and disabling at least some among the plurality of interface components according to a level of the detected voltage.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

The present disclosure may be modified in various forms and may have a variety of embodiments, and, therefore, specific embodiments will be illustrated in the drawings and a description thereof will be described. These embodiments, however, are not to be taken in a sense which limits the present disclosure to the specific embodiments, and should be construed to include modification, equivalents, or substituents within the spirit and technical scope of the present disclosure.

Also, the terms including ordinal numbers such as second, first, and the like used herein can be used to describe various components, but the various components are not limited by these terms. These terms are used only for the purpose of distinguishing one component from another component. For example, without departing from the scope of the present disclosure, a second component may be referred to as a first component, and similarly, the first component may also be referred to as the second component. The term "and/or" includes a combination of a plurality of related listed items or any item of the plurality of related listed items.

When a component is referred to as being "connected," or "coupled" to other component, it may be directly connected or coupled to the other component, but it should be understood that another component may exist between the component and the other component. Contrarily, when a component is referred to as being "directly connected," or "directly coupled" to other component, it should be understood that another component may be absent between the component and the other component.

The terms used herein are employed to describe only specific embodiments and are not intended to limit the present disclosure. Unless the context clearly dictates otherwise, the singular form includes the plural form. It should be understood that the terms of "comprise" or "have" specify the presence of stated herein features, digits, steps, operations, components, elements, or a combination thereof, but do not preclude the presence or probability of addition of one or more other features, digits, steps, operations, components, elements, or a combination thereof.

Unless otherwise defined, all terms including technical or scientific terms used herein have the same meaning as commonly understood by those skilled in the art to which the present disclosure pertains. General terms that are defined in a dictionary shall be construed to have meanings that are consistent in the context of the relevant art, and will not be interpreted as having an idealistic or excessively formalistic meaning unless clearly defined in the present application.

Hereinafter, embodiments of the present disclosure will be described in detail with reference to the drawings, the same reference numerals are given to the same or corresponding components regardless of reference numerals, and a repetitive description thereof will be omitted.

Figure 1:
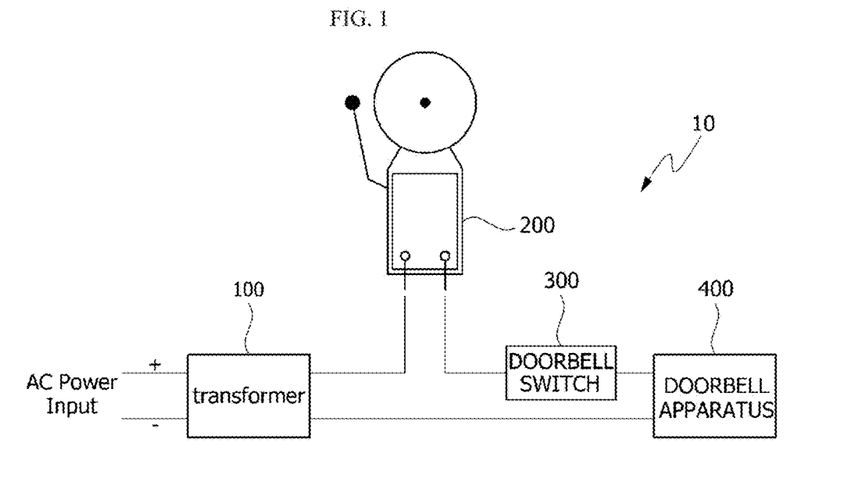
FIG. 1 is a diagram illustrating a doorbell system according to one embodiment of the present disclosure.

FIG. 1 is a diagram illustrating a doorbell system according to one embodiment of the present disclosure.

Referring to FIG. 1, a doorbell system 10 according to one embodiment of the present disclosure includes a transformer 100, a doorbell 200, a doorbell switch 300, and a doorbell apparatus 400

The transformer 100 may include a primary coil and a secondary coil. The primary coil may be connected to an alternating current (AC) power source (not shown) provided at home, and the second coil may be connected in series to the doorbell 200, the doorbell switch 300, and the doorbell apparatus 400. The transformer 100 converts a level of an AC voltage into a level thereof suitable for operating the doorbell 200. The doorbell 200 is a device for outputting a sound using electromagnetism or electricity, and may be interchangeably used with a bell, a buzzer, a chime, and the like. The doorbell switch 300 is a switch that is usually in an open state, and, when the doorbell switch 300 is pressed, the doorbell 200 is activated to output a sound.

Further, the doorbell apparatus 400 according to one embodiment of the present disclosure may include a plurality of interfaces, and may be connected to a conventional doorbell system, that is, the transformer 100, the doorbell 200, and the doorbell switch 300.

In accordance with one embodiment, while an overcurrent inside the doorbell system 10 is limited, power may be stably supplied to an interface included in the doorbell apparatus 400 regardless of an ON or OFF state and installation environment of the doorbell switch 300.

Figure 2:
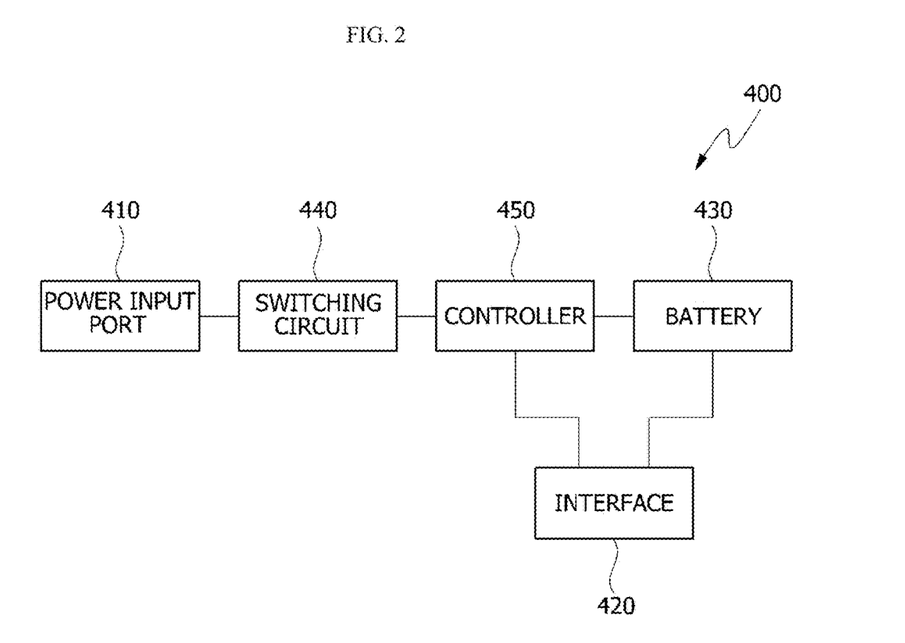
FIG. 2 is a block diagram of a doorbell apparatus according to one embodiment of the present disclosure.
Figure 3:
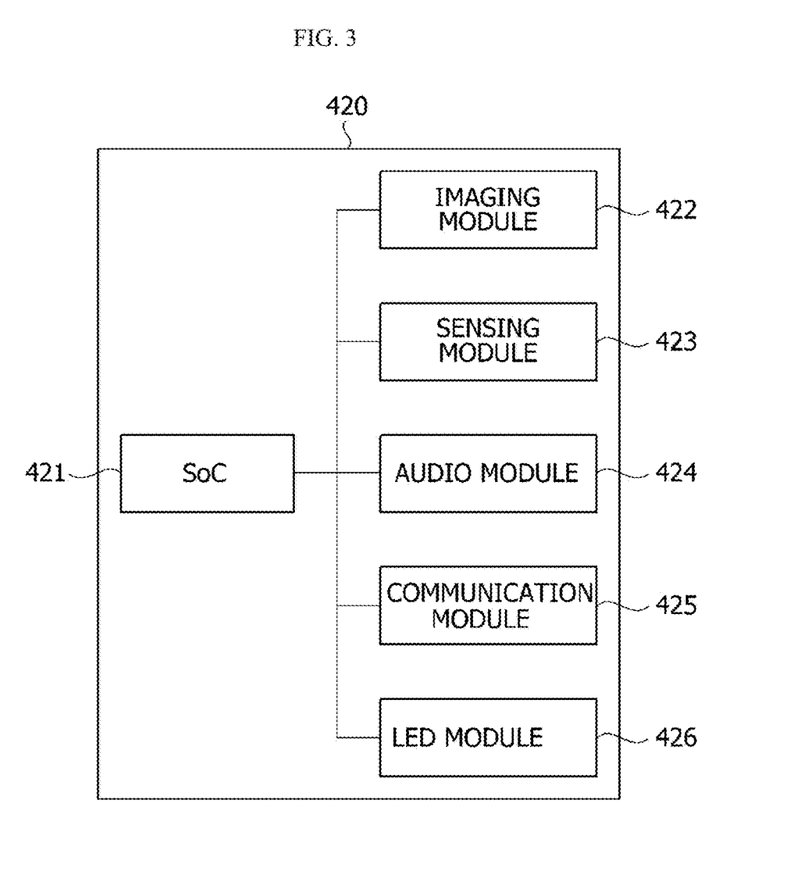
FIG. 3 is a block diagram of an interface included in the doorbell apparatus according to one embodiment of the present disclosure.

FIG. 2 is a block diagram of the doorbell apparatus 400 according to one embodiment of the present disclosure, and FIG. 3 is a block diagram of an interface included in the doorbell apparatus 400 according to one embodiment of the present disclosure.

Referring to FIG. 2, the doorbell apparatus 400 includes a power input port 410, an interface 420, a battery 430, a switching circuit 440, and a controller, 450.

The power input port 410 supplies power to the doorbell apparatus 400. At this point, the power supplied by the power input port 410 may be an AC voltage that is received from the AC power source provided at home. The power input port 410 is shown to be included in the doorbell apparatus 400, but it is not limited thereto. The power input port 410 may also be an external configuration of the doorbell apparatus 400. Since the power input port 410 supplies the power inside the doorbell apparatus 400, it may also be referred to as a power supplier. In the present description, the term of a "power input port" may be interchangeably used with an "input port configured to receive power," an "input port," or the like.

The switching circuit 440 is connected to the doorbell switch 300 to change a path of a current supplied from the power input port 410 according to an ON or OFF state of the doorbell switch 300. That is, when the doorbell switch 300 is in an OFF state, the switching circuit 440 may control a path of a current to be directed to the interface 420 and the battery 430 via the controller 450. Consequently, the current is output to the controller 450, and then is supplied to the interface 420 or is charged in the battery 430. Contrarily, when the doorbell switch 300 is in an ON state, the switching circuit 440 may control a path of the current to be directed to the doorbell 200 and the doorbell switch 300. At this point, when the current flows to the doorbell switch 300, a path on which the current flows to the controller 450 is blocked, and the controller 450 may control the battery 430 to supply power to the interface 420.

The controller 450 controls charging of the battery 430 using the current that is output from the switching circuit 440, and controls a power supply to the interface 420. The controller 450 may include a battery management integrated circuit (BMIC).

The battery 430 supplies power to the interface 420.

Referring to FIG. 3, the interface 420 includes a system on chip (SoC) 421 and a plurality of interface components. The plurality of interface components may include, for example, an imaging module 422, a sensing module 423, an audio module 424, a communication module 425, and a light emitting diode (LED) module 426. However, the above-described interface components are merely examples, and the interface 420 according to one embodiment of the present disclosure may include the number of interface components that is greater or less than that of the above-described interface components. In the present description, the SoC 421 may be interchangeably used with a first controller, and the controller 450 may be interchangeably used with a second controller.

The SoC 421 may be connected to the imaging module 422, the sensing module 423, the audio module 424, the communication module 425, and the LED module 426 to entirely control the interface 420. For example, the SoC 421 may control enabling or disabling of the plurality of interface components which are included in the interface 420.

The imaging module 422 may include a camera unit. The camera unit may include a lens and an image sensor. The lens includes at least one among a convex lens, a concave lens, a cylindrical lens, a Fresnel lens, and a wide-angle lens, and is configured to take an image of a target object that is positioned within a predetermined range from an installation position of the lens. The image sensor converts an optical signal incident through the lens into an image signal. The image sensor corresponds to a component that is generally employed in a digital camera and the like, and serves to convert light incident through the lens, that is, taken image information into digital information that is in a form of an electrical signal.

The sensing module 423 senses a surrounding target object. The sensing module 423 may include at least one among a geomagnetic sensor, an acceleration sensor, an altimeter, a gyro sensor, an infrared sensor, and a proximity sensor. Here, the infrared sensor may be a passive infrared ray (PIR) sensor. The PIR sensor may sense temperature variation of a target object. Therefore, when human moves, the sensing module 423 may sense existence of the human using temperature variation. A plurality of sensing modules 423 may be installed at the periphery of the imaging module 422.

The SoC 421 receives an image signal through the imaging module 422 and a sensing signal with respect to a target object through the sensing module 423 to process the received image signal and the received sensing signal. For example, the SoC 421 may compensate for the image signal received through the imaging module 422 using the sensing signal, which is received through the sensing module 423, with respect to the target object.

The audio module 424 may include a microphone and a speaker. The microphone may receive an audio signal, and the speaker may output the audio signal. The SoC 421 may process the audio signal that is input through the microphone.

The communication module 425 includes a wired or wireless communication module, and may transmit the image signal that is processed through the SoC 421 to a display device (not shown), or the audio signal that is processed through the SoC 421 to the speaker.

The LED module 426 is a light emitting module, and may be interchangeably used with a flash LED module.

Here, the interface 420 may operate in a sleep mode or in an operation mode. The interface 420 may convert from the sleep mode to the operation mode by an operating signal that is transmitted to the interface 420 on the basis of a current flowing to the doorbell switch 300 when the doorbell switch 300 is in an ON state. In the present description, the operation mode may be interchangeably used with an overrun mode, a first operation mode, and the like, and the sleep mode may be interchangeably used with a charging mode, a second operation mode, and the like. Table 1 represents enabling or disabling of the interface components inside the interface 420 when the interface 420 operates in the sleep mode or the operation mode. However, Table 1 is merely an example, and the present disclosure is not limited thereto.

TABLE 1

| Interface | Operation Mode | | Sleep Mode | | |
| --- | --- | --- | --- | --- | --- |
| | Triggered | Normal | Low Battery | Full Charged | Low Battery |
| Communication Module | ○ | ○ | ○ | ○ | ○ |
| Audio Module | ○ | ○ | ○ | ○ | X |
| LED Module | ○ | ○ | X | X | X |
| Sensing Module | ○ | ○ | ○ | ○ | ○ |
| Imaging Module | X | ○ | ○ | ○ | ○ |
| Battery Charging | X | X | ○ | AUTO | ○ |
| Current Limitation (milliampere (mA)) | 250 | 250 | 350 | AUTO | — |

Meanwhile, when a current that is output from the power input port 410 and the switching circuit 440 to flow to the controller 450 is equal to or greater than a predetermined value, this may entirely affect to the doorbell system 10. For example, when a current that is output from the switching circuit 440 to flow to the controller 450 is equal to or greater than a predetermined value (for example, 250 mA), this may affect to an electromagnetic structure of the doorbell 200, and thus the doorbell 200 may perform an incorrect operation or noise may occur. Consequently, there is a need for limiting the current, which flows from the switching circuit 440 to the controller 450, to a value that is less than or equal to the predetermined value.

However, when a current that flows from the switching circuit 440 to the controller 450 is limited, power may not be sufficiently supplied to the interface 420. For instance, it will be described an example in which power that is equal to or greater than 2.4 watt (W) is required for all the interface components included in the interface 420 to operate normally. When a voltage of the power input port 410 is 16 volts (V) and a current that is output from the switching circuit 440 to flow to the controller 450 is limited to 250 mA, efficiency of power is reduced to about 60% while the power passes through the switching circuit 440 such that power of about 2.4 W (calculated by 16 V×250 mA×0.6) may be supplied to the controller 450.

Meanwhile, when the doorbell switch 300 converts from an ON state to an OFF state, the doorbell apparatus 400 should enable all the imaging module 422, the sensing module 423, the audio module 424, and the communication module 425 which are included in the interface 420. At this point, power that is simultaneously required for the interface 420 and the battery 430 exceeds 2.4 W so that an overcurrent may be induced inside the doorbell apparatus 400.

Consequently, in one embodiment of the present disclosure, a current that is supplied to the interface 420 will be limited according to a mode for which the interface 420 operates.

Figure 4:
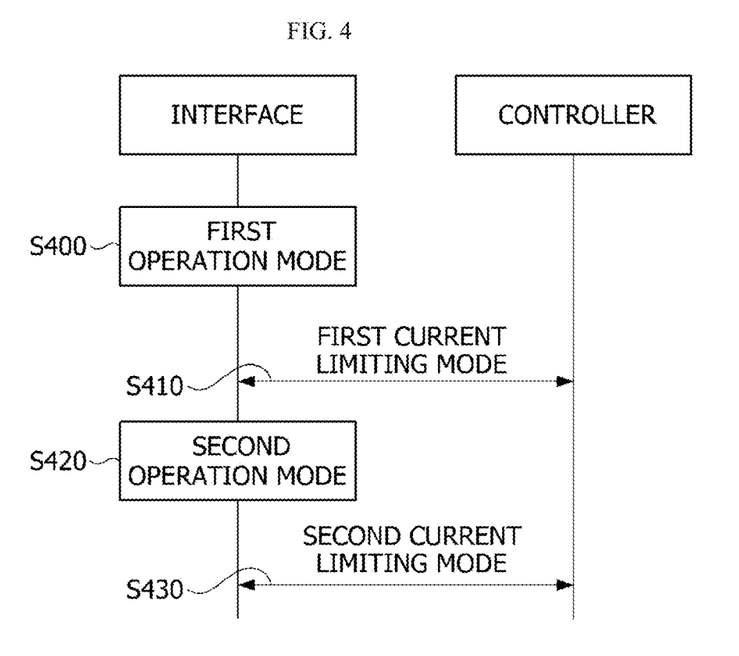
FIG. 4 is a flowchart illustrating a current limiting method according to one embodiment of the present disclosure.

FIG. 4 is a flowchart illustrating a current limiting method according to one embodiment of the present disclosure.

Referring to FIG. 4, when the interface 420 operates in a first operation mode in Operation S400, the controller 450 supplies a current to the interface 420 using a first current limiting mode in Operation S410, and, when the interface 420 operates in a second operation mode in Operation S420, the controller 450 supplies a current to the interface 420 using a second current limiting mode in Operation S430.

Here, the number of interface components, which are enabled in the first operation mode inside the interface 420, may be greater than that of interface components which are enabled in the second operation mode inside the interface 420. Further, a maximum current, which is supplied to the interface 420 in a first current limiting mode, may be less than that supplied to the interface 420 in a second current limiting mode.

Consequently, in the first operation mode, that is, when power required inside the interface 420 is large, power supplied through the controller 450 may be controlled not to exceed a maximum 2.4 W by limiting the maximum current supplied to the interface 420 to low, and insufficient power required for the interface 420 to stably operate may be controlled to be supplied from the battery 430.

Also, in the second operation mode, that is, when power required inside the interface 420 is less than that in the first operation mode, the controller 450 may operate in the second current limiting mode to increase a charging amount of the battery 430.

At this point, the first current limiting mode may be a universal serial bus (USB) 2.0 mode, and the second current limiting mode may be a USB 3.0 mode. Further, in the first current limiting mode, the controller 450 and the SoC 421 may be connected through a USB 2.0 port, and, in the second current limiting mode, the controller 450 and the SoC 421 may be connected through a USB 3.0 port.

Hereinafter, the doorbell apparatus 400 according to one embodiment of the present disclosure will be described in detail using a circuit diagram.

Figure 5:
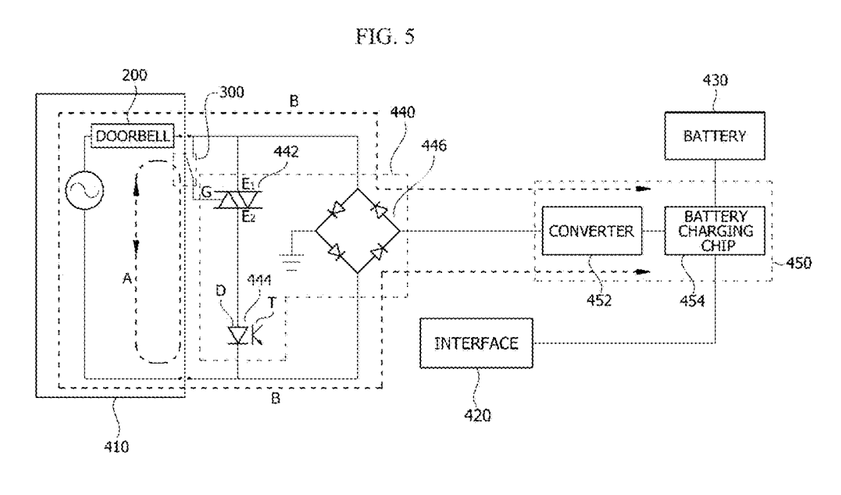
FIG. 5 is a circuit diagram included in the doorbell apparatus according to one embodiment of the present disclosure.

FIG. 5 is a circuit diagram included in the doorbell apparatus 400 according to one embodiment of the present disclosure.

Referring to FIG. 5, AC power is supplied to the doorbell apparatus 400 through the power input port 410. It will be described an example in which AC power of 16 V and 250 mA is supplied through the power input port 410.

The switching circuit 440 is connected to the doorbell switch 300, and may include a triac element 442. The triac element 442 is a semiconductor control component configured to perform a bidirectional current control, and includes two main electrodes E1 and E2 and a single gate electrode G. When a gate signal is not applied to the gate electrode G, the triac element 442 may be turned off, while when a gate signal is applied to the gate electrode G, the triac element 442 may be bidirectionally turned on regardless of polarity of each of the two main electrodes E1 and E2.

When the doorbell switch 300 is pressed, that is, the doorbell switch 300 becomes in an ON state, a gate signal is applied to the gate electrode G of the triac element 442 and thus a closed circuit is formed in Path A. That is, Path A of the current may be directed to the doorbell 200 and the doorbell switch 300, and the current may be blocked from flowing on Rout B that is directed to the controller 450. Since the current does not flow to the controller 450, power required for the interface 420 may be supplied from the battery 430.

Here, the doorbell 200 and the power input port 410 including the doorbell 200 are exemplified to form a configuration that is included in the doorbell apparatus 400 according to one embodiment of the present disclosure, but the present disclosure is not limited to such a configuration. The doorbell 200 and the power input port 410 including the doorbell 200 may not be included in the doorbell apparatus 400 according to one embodiment of the present disclosure. Consequently, the doorbell apparatus 400 according to one embodiment of the present disclosure may be interchangeably used with a doorbell 200 and a power input port 410 including the doorbell 200 which are conventionally preinstalled at home.

Meanwhile, the switching circuit 440 may further include a gate element 444. The gate element 444 is connected to the triac element 442, and, when the triac element 442 is turned on, it may operate on the basis of a current flowing to the doorbell 200 and the doorbell switch 300. Further, the gate element 444 may transmit an operating signal to the interface 420 on the basis of the current flowing to the doorbell 200 and the doorbell switch 300. To this end, the gate element 444 may include an opto-coupler. The opto-coupler may be interchangeably used with a photo-coupler. The opto-coupler includes a light emitting diode D and a photo transistor T, and, when a current is applied to the light emitting diode D, the light emitting diode D emits light. The photo transistor T may receive the light emitted from the light emitting diode D to become in a conducting state. Using such a principle, when the doorbell switch 300 is pressed, that is, the doorbell switch 300 becomes in an ON state, the gate element 444 may transmit a signal for operating the interface 420.

Meanwhile, when the pressed state of the doorbell switch 300 is released, that is, the doorbell switch 300 becomes in an OFF state, a path of the current is directed to the controller 450. To this end, the switching circuit 440 may further include a rectifier 446. The rectifier 446 is connected to the controller 450, and rectifies an AC current supplied from the power input port 410 to a direct current (DC) current to supply the DC current to the controller 450. At this point, the rectifier 446 may include, for example, a bridge diode. As shown in FIG. 5, the bridge diode is a bridge circuit in which four diodes are connected. The bridge diode rectifies and outputs an AC current to a DC current, and a voltage that is input to the bridge diode is the same as that which is output from the bridge diode. Generally, when power passes through the bridge diode, efficiency of the power may be reduced to about 60%. For example, when power of 4 W (calculated by 16 V×250 mA) is supplied through the power input port 410, after passing the bridge diode, the power of about 2.4 W may be supplied to the controller 450.

The controller 450 receives the DC current that is rectified by the rectifier 446. The controller 450 may include a converter 452 and a battery charging chip 454. The converter 452 may lower a level of a voltage corresponding to the DC current that is output through the rectifier 446 to a level of a voltage required for charging the battery charging chip 454. Here, the converter 452 may be a DC-DC converter. For example, the converter 452 may convert a voltage in a range of 8 to 24 V into a voltage of 5 V.

The battery charging chip 454 is connected to the converter 452 to receive a predetermined voltage therefrom. The battery charging chip 454 may control to supply power to the interface 420, or the battery 430 to charge the power therein. The battery charging chip 454 may control the battery 430 to supply the power charged therein to the interface 420. The battery charging chip 454 may be interchangeably used with a BMIC.

For example, when the doorbell switch 300 is in an ON state, an operating signal may be transmitted to the interface 420 through the switching circuit 440, but the power may be insufficient for the interface 420 to consistently operate. Accordingly, when the doorbell switch 300 is in the ON state and a path of a current that is output to flow to the controller 450 is blocked, the controller 450 may control the battery 430 to supply the power charged therein to the interface 420.

In addition, when the doorbell switch 300 is in an OFF state, the battery charging chip 454 may control to supply a portion of a voltage, which is rectified by the rectifier 466 and then is converted by the converter 452, to the interface 420, and to supply the remaining portion thereof to the battery 430. For example, power of 0.5 W (calculated by 5 V×100 mA) may be set by default to be supplied to the battery 430. Meanwhile, at a moment when the doorbell switch 300 converts from the ON state to the OFF state, that is, immediately after the doorbell 200 is pressed, most of the interface components of the interface 420, for example, the imaging module 422, the audio module 424, the communication module 425, and the sensing module 423 should operate. At this point, power required for both the battery 430 and the interface 420 may exceed 2.4 W. In accordance with the embodiment of the present disclosure, in such an operation mode, the battery charging chip 454 will be operated in the USB 2.0 mode, that is, in a current limiting mode of 450 mA. When the battery charging chip 454 operates in the USB 2.0 mode, maximum power being transmitted to the interface 420 is 2.25 W (calculated by 5 V×450 mA) so that the power being transmitted to the controller 450 does not exceed 2.4 W. Meanwhile, in a mode, for example, the second operation mode, in which the number of interface components that operate is less than that of interface components that operate in the first operation mode, the battery charging chip 454 may operate in the USB 3.0 mode, that is, in a current limiting mode of 850 mA. Only a current of about 100 mA is preset to be supplied to the battery 430 so that, even in such a case, the power being transmitted to the controller 450 does not exceed 2.4 W.

Accordingly, even in the first operation mode in which the interface 420 overruns, the interface 420 may stably operate and further an entire current of the doorbell apparatus 400 may not exceed a limited range. Moreover, in the second operation mode for charging the battery 430, charging efficiency of the battery 430 may be improved.

Meanwhile, when a voltage of the power input port 410 is less than 16 V, sufficient power required for the interface 420 to be able to operate may not be supplied to the controller 450. Accordingly, in the embodiment of the present disclosure, a voltage detector 460 configured to detect a voltage of the power input port 410 is further included, and an operation scenario of the interface 420 will be differently set according to a voltage detection result.

Figure 6:
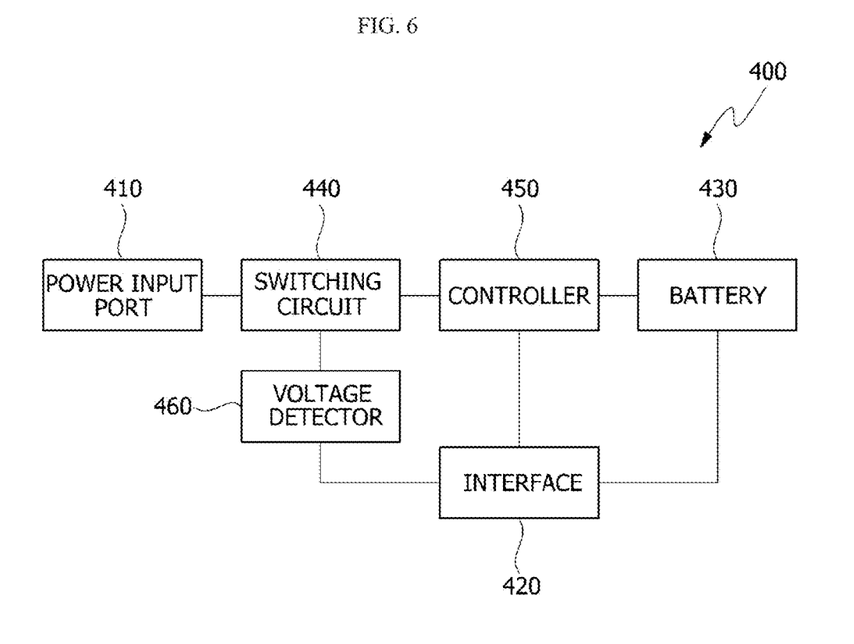
FIG. 6 is a block diagram of a doorbell apparatus according to another embodiment of the present disclosure.
Figure 7:
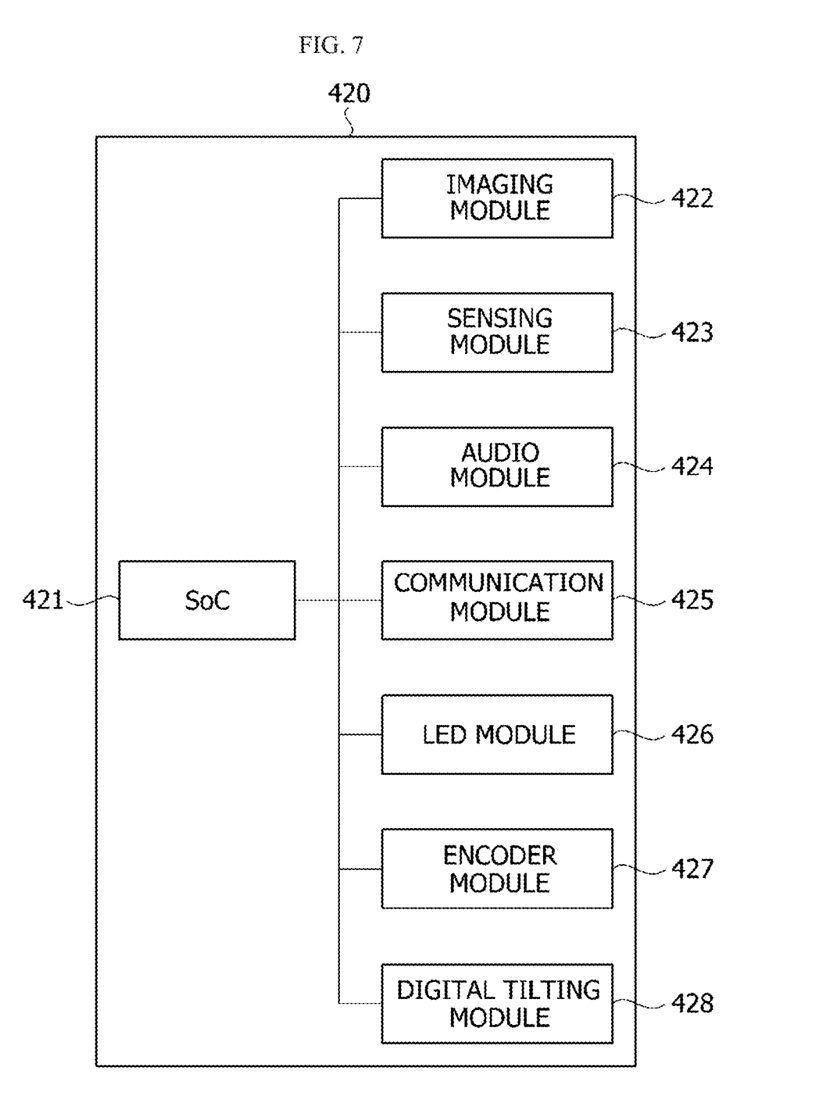
FIG. 7 is a block diagram of an interface according to another embodiment of the present disclosure.

More particularly, referring to FIGS. 6 and 7, the voltage detector 460 is connected between the power input port 410 and the interface 420 to detect a voltage of the power input port 410.

In accordance with the embodiment of the present disclosure, at least some among a plurality of functions included in the interface 420 may be enabled or disabled according to a level of a voltage detected by the voltage detector 460.

Generally, in a condition in which an input voltage is 16 V and an input current is 250 mA, or the input voltage is 24 V and the input current is 250 mA, the interface 420 stably operates. However, the AC power source that is pre-installed at home may have a specification that is less than or equal to 16 V. In such a case, when the doorbell apparatus 400 senses an input voltage in advance and the input voltage is less than equal to a predetermined voltage, it may disable some function, which consumes large power, among the plurality of functions that are included in the interface 420. Also, when a distance between the AC power source that is pre-installed at home and the doorbell apparatus 400 is far away, a voltage is dropped in proportion to the distance and thus a voltage that is less than or equal to 16 V may be substantially input to the doorbell apparatus 400. Even in such a case, the interface 420 of the doorbell apparatus 400 may disable some function consuming large power to thereby stably operate.

For example, as shown in FIG. 7, when the interface 420 further includes an encoder module 427, the encoder module 427 consumes large power. Accordingly, the SoC 421 may be set to enable or disable the encoder module 427 according to a level of a voltage detected by the voltage detector 460.

Table 2 exemplifies an operation scenario of the interface 420 when a voltage detected by the voltage detector 460 is equal to or greater than 16 V, and Table 3 exemplifies an operation scenario of the interface 420 when the voltage detected by the voltage detector 460 is less than 16 V. Table 2 and Table 3 are examples for convenience of description, and thus the present disclosure is not limited thereto.

TABLE 2

| Equal To or Greater Than 16 V | Operation Mode | | Sleep Mode | | |
|---|---|---|---|---|---|
| | Triggered | Normal | Low Battery | Full Charged | Low Battery |
| Encoder Module | O | O | O | O | O |
| Communication Module | O | O | O | O | O |
| Audio Module | O | O | O | O | X |
| LED Module | O | O | X | X | X |
| Sensing Module | O | O | O | O | O |
| Imaging Module | X | O | O | O | O |
| Battery Charging | X | X | O | AUTO | O |
| Current Limitation (mA) | 250 | 250 | 350 | AUTO | — |

TABLE 3

| Less Than 16 V | Operation Mode | | Sleep Mode | | |
|---|---|---|---|---|---|
| | Triggered | Normal | Low Battery | Full Charged | Low Battery |
| Encoder Module | O | O | O | X | X |
| Communication Module | O | O | O | O | O |
| Audio Module | O | O | O | X | X |
| LED Module | O | O | X | X | X |
| Sensing Module | O | O | O | O | O |
| Imaging Module | X | O | O | X | X |
| Battery Charging | X | X | O | AUTO | O |
| Current Limitation (mA) | 250 | 250 | 350 | AUTO | — |

Referring to Table 2 and Table 3, during the sleep mode of the interface 420, when a voltage that is equal to or greater than 16 V is detected, the SoC 421 may be set to enable the encoder module 427, and, when the voltage that is less than 16 V is detected, the SoC 421 may be set to disable the encoder module 427. Also, during the operation mode or the sleep mode of the interface 420, the SoC 421 may further consider a state of the battery 430 to set enabling or disabling of the interface components included in the interface 420.

At this point, the encoder module 427 is a module configured to encode a signal, and may compress an image that is taken by the imaging module 422. Generally, the imaging module 422 included in the interface 420 may employ an image sensor with resolution of 960×1280 pixels, but it encodes an image with a resolution of 720×1280 pixels to transmit a picture having a 16:9 ratio. At this point, even when the imaging module 422 includes, for example, a wide-angle lens having a view angle of 180 degrees, an image with distorted left and right sides is corrected and then cropped to exhibit left and right sides of the image by a narrow angle. When left and right view angles of the imaging module 422 are narrow, an object may not be recognized according to some installation environment. That is, when the imaging module 422 is installed in front of a door or at a side thereof to recognize an object, left and right sides of an image are exhibited with a narrow angle so that the image is displayed on a picture in a state that a portion of the object is cropped.

Figure 8:
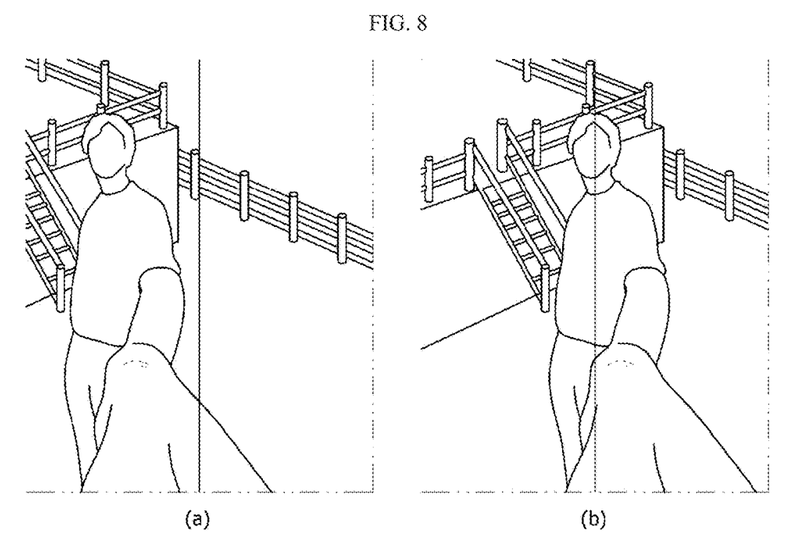
FIG. 8 is a diagram illustrating an effect of a digital tilting.

Accordingly, the interface 420 according to the embodiment of the present disclosure may further include a digital tilting module 428. The digital tilting module 428 horizontally and vertically tilts an image recognized by the imaging module 422. When the SoC 421 receives an image signal from the imaging module 422, it may set the encoder module 427 to perform an encoding after the digital tilting module 428 tilts the image signal. FIG. 8 is a diagram illustrating an effect of a digital tilting. FIG. 8A illustrates a picture that is displayed on a display device when a digital tilting is not performed, and FIG. 8B illustrates a picture that is displayed on the display device when the digital tilting is performed. Comparing FIG. 8A with FIG. 8B, when the digital tilting is performed, the center of the picture being displayed on the display device may be coincided with the object. At this point, a tilt angle of the digital tilting module 428 may be preset by an installer of the doorbell apparatus 400, or may be remotely controlled through the communication module 425.

As similar to the encoder module 427, such a digital tilting module 428 consumes large power. Accordingly, during the sleep mode of the interface 420, when a voltage that exceeds 16 V is detected, the SoC 421 may be set to enable both the encoder module 427 and the digital tilting module 428, but, when a voltage that is less than or equal to 12 V is detected, the SoC 421 may be set to disable both the encoder module 427 and the digital tilting module 428. Further, when a voltage that exceeds 12 V and is less than or equal to 16 V is detected, the SoC 421 may be set to enable the encoder module 427 and disable the digital tilting module 428. Also, during the operation mode or the sleep mode of the interface 420, the SoC 421 may further consider a state of the battery 430 to set enabling or disabling of the interface components included in the interface 420.

Figure 9:
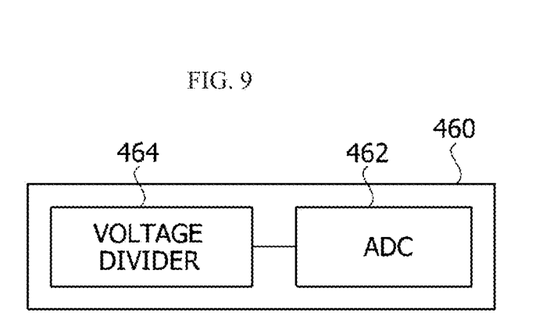
FIG. 9 is a block diagram of a voltage detector included in the doorbell apparatus according to one embodiment of the present disclosure.

FIG. 9 is a block diagram of the voltage detector 460 included in the doorbell apparatus 400 according to one embodiment of the present disclosure.

Referring to FIG. 9, the voltage detector 460 includes an analog digital converter (ADC) 462. The ADC 462 is connected between the power input port 410 and the interface 420 to convert an AC voltage of the power input port 410 into a digital value. As one example, when a voltage of the power input port 410 is less than or equal to a predetermined voltage, the ADC 462 may output a first digital value, and, when the voltage thereof exceeds the predetermined voltage, the ADC 462 may output a second digital value. Further, when the first digital value is input to the SoC 421 of the interface 420, the encoder module 427 may be disabled, and, when the second digital value is input to the SoC 421 of the interface 420, the encoder module 427 may be enabled. Also, the digital tilting module 428 may be set to operate according to disabling or enabling of the encoder module 427. As another example, when a voltage of the power input port 410 is less than or equal to a first voltage, the first digital value may be output, when the voltage of the power input port 410 exceeds the first voltage and is less than or equal to a second voltage, the second digital value may be output, and, when the voltage of the power input port 410 exceeds the second voltage, a third digital value may be output. When the first digital value is input to the SoC 421 of the interface 420, the SoC 421 may disable the encoder module 427 and the digital tilting module 428, when the second digital value is input to the SoC 421, the SoC 421 may enable the encoder module 427 and disable the digital tilting module 428, and, when the third digital value is input to the SoC 421, the SoC 421 may enable both the encoder module 427 and the digital tilting module 428.

At this point, the ADC 462 may be disposed inside the SoC 421 of the interface 420. To this end, the voltage detector 460 may further include a voltage divider 464. The voltage divider 464 may divide a voltage of the power input port 410 to lower a level of the voltage, which is receivable by the SoC 421.

To this end, the voltage divider 464 may include a first resistor and a second resistor which are connected in series, and the ADC 462 may branch from a first node, which connects the first resistor to the second resistor, to be connected to the SoC 421 of the interface 420.

As is described above, when the voltage detector 460 detects a voltage that is input from the power input port 410 and converts the detected voltage into a quantized value to output the quantized value to the SoC 421 of the interface 420, the SoC 421 may enable or disable some among a plurality of interface components included in the interface 420, for example, the encoder module 427 and the digital tilting module 428 which each consume relative large power compared to other interface components among the plurality of interface components. Consequently, the interface 420 may stably operate according to the level of the voltage that is input to the power input port 410.

Figure 10:
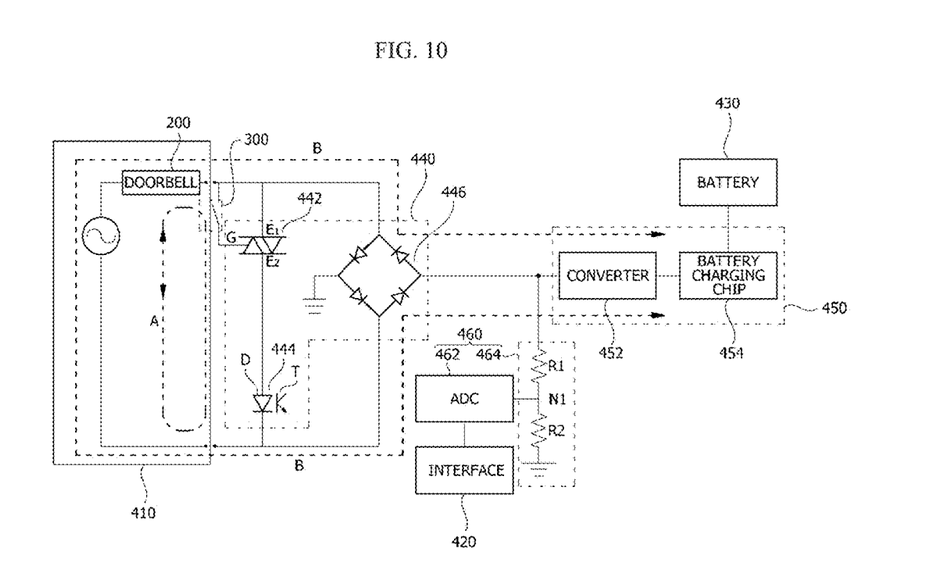
FIG. 10 is a circuit diagram included in the doorbell apparatus according to another embodiment of the present disclosure.

FIG. 10 is a circuit diagram included in a doorbell apparatus 400 according to another embodiment of the present disclosure. Other content except for a voltage detector 460 is the same as that which has been described in FIG. 5, and thus a repetitive description thereof will be omitted.

Referring to FIG. 10, the voltage detector 460 may be connected between a power input port 410 and an interface 420, and more particularly, between a switching circuit 440 and the interface 420.

The voltage detector 460 includes an ADC 462 and a voltage divider 464, the voltage divider 464 includes a first resistor R1 and a second resistor R2 which are connected in series, and the ADC 462 may branch from a first node N1, which connects the first resistor R1 to the second resistor R2, to be connected to an SoC 421 of the interface 420.

The first resistor R1 and the second resistor R2, which are connected to the switching circuit 440, divide a voltage having a level, which is able to be input to the SoC 421, to input the divided voltage to the ADC 462. The ADC 462 may convert a voltage across the second resistor R2 into a digital value to output the digital value to the SoC 421 of the interface 420.

When a voltage detected by the voltage detector 460 is less than or equal to a predetermined voltage, that is, the ADC 462 outputs a first digital value, the SoC 421 of the interface 420 may be set to disable some interface component, for example, an encoder module that consumes large power. When a voltage detected by the voltage detector 460 is equal to or greater than the predetermined voltage, that is, the ADC 462 outputs a second digital value, the SoC 421 of the interface 420 may be set to enable entire modules.

Consequently, the interface 420 included in the doorbell apparatus 400 may stably operate regardless of installation environment or power situation, and an object may be positioned on a central line of a picture that is taken by an imaging module 422 and then displayed on a display device.

In the present description, it has been exemplified and described that the doorbell 200 and the doorbell switch 300 are pre-installed at home, but they are not limited thereto. At least one of the doorbell 200 and the doorbell switch 300 may be included in the doorbell apparatus 400 according to one embodiment of the present disclosure.

The doorbell apparatus according to the embodiment of the present disclosure may stably supply power to the interface. Particularly, in accordance with the embodiment of the present disclosure, even when a plurality of modules inside the interface operate simultaneously, the interface may stably operate, and a problem in that an over-current flows inside the doorbell apparatus may be prevented. In addition, even when a closed circuit is formed with respect to the doorbell, the doorbell apparatus according to the embodiment of the present disclosure may stably supply power to the interface.

As is described above, while the description has been made with reference to the preferred embodiments of the present disclosure, it should be understood that various alternations and modifications of the present disclosure can be devised by those skilled in the art within a range without departing from the spirit and scope of the present disclosure, which are defined by the appended claims.

What is claimed is:

1. A doorbell apparatus comprising:
   an input port configured to receive power;
   an interface including a plurality of interface components and a first controller that is set to control the plurality of interface components;
   a battery configured to supply the power to the interface;
   a switching circuit connected to a switch and configured to change a path of a current that is supplied from the input port according to an ON or OFF state of the switch; and
   a second controller configured to control charging of the battery and a current supply to the interface using the current that is output from the switching circuit,
   wherein the second controller limits a current supplied to the interface according to an operation mode of the interface, and
   the operation mode includes a first operation mode and a second operation mode in which power required inside the interface is less than that of the first operation mode.

2. The doorbell apparatus of claim 1, wherein the second controller operates in a first current limiting mode or a second current limiting mode, and
   a maximum current supplied to the interface according to the first current limiting mode is less than that supplied to the interface according to the second current limiting mode.

3. The doorbell apparatus of claim 2, wherein, when the interface is in the first operation mode, the second controller operates in the first current limiting mode,
   when the interface is in the second operation mode, the second controller operates in the second current limiting mode, and
   the number of interface components that are enabled in the first operation mode is greater than that of interface components that are enabled in the second operation mode.

4. The doorbell apparatus of claim 3, wherein, while the interface operates in the first operation mode and the second controller operates in the first current limiting mode, power charged in the battery is additionally supplied to the interface.

5. The doorbell apparatus of claim 3, wherein, while the interface operates in the second operation mode and the second controller operates in the second current limiting mode, the battery is charged.

6. The doorbell apparatus of claim 3, wherein, when the switch transits from an ON state to an OFF state, the interface operates in the first operation mode.

7. The doorbell apparatus of claim 3, wherein the first current limiting mode is a universal serial bus (USB) 2.0 mode, and the second current limiting mode is a USB 3.0 mode.

8. The doorbell apparatus of claim 3, wherein, in the first current limiting mode, a maximum current that is able to be supplied from the second controller to the interface is 450 milliampere (mA), and, in the second current limiting mode, a maximum current that is able to be supplied from the second controller to the interface is 850 mA.

9. The doorbell apparatus of claim 1, further comprising:
a voltage detector configured to detect a voltage between the input port and the interface,
wherein at least some interface components among the plurality of interface components are enabled or disabled according to a level of the voltage that is detected by the voltage detector.

10. The doorbell apparatus of claim 9, wherein, when a voltage of the input port is less than or equal to a predetermined voltage, the voltage detector outputs a first digital value, and, when the voltage of the input port exceeds the predetermined voltage, the voltage detector outputs a second digital value; and
when the first digital value is input, the first controller disables at least one among the plurality of interface components.

11. The doorbell apparatus of claim 9, wherein the interface includes at least one of an encoder and a digital tilter, and the first controller is set to enable or disable at least one of the encoder and the digital tilter according to the level of the voltage that is detected by the voltage detector.

12. A method for limiting a current of a doorbell apparatus, comprising:
receiving power through an input port;
changing a path of a current that is supplied through the input port according to an ON or OFF state of a switch; and
controlling charging of a battery and a current supply to an interface using the current of which the path is changed,
wherein the controlling of the charging and the current supply includes:
limiting the current supplied to the interface according to an operation mode of the interface,
wherein the operation mode includes a first operation mode and a second operation mode in which power required inside the interface is less than that of the first operation mode.

13. The method of claim 12, wherein the limiting of the current includes:
setting a first current limiting mode when the interface is in the first operation mode; and
setting a second current limiting mode when the interface is in the second operation mode,
wherein a maximum current supplied to the interface according to the first current limiting mode is less than that supplied to the interface according to the second current limiting mode.

14. The method of claim 13, wherein the interface includes a plurality of interface components, and
the number of interface components that are enabled in the first operation mode is greater than that of interface components that are enabled in the second operation mode.

15. The method of claim 13, wherein the controlling of the charging and the current supply further includes:
controlling to additionally supply power charged in the battery to the interface when the first current limiting mode is set.

16. The method of claim 13, wherein the controlling of the charging and the current supply further includes:
controlling the battery to be charged when the second current limiting mode is set.

17. The method of claim 14, further comprising:
detecting a voltage between the input port and the interface; and
disabling at least some among the plurality of interface components according to a level of the detected voltage.

* * * * *